(12) United States Patent
Hsu et al.

(10) Patent No.: US 8,914,946 B2
(45) Date of Patent: Dec. 23, 2014

(54) DUAL-SHAFT PIVOT DEVICE

(71) Applicant: First Dome Corporation, New Taipei (TW)

(72) Inventors: An Szu Hsu, New Taipei (TW); Ya Ching Lin, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 13/897,503

(22) Filed: May 20, 2013

(65) Prior Publication Data

US 2014/0338483 A1    Nov. 20, 2014

(51) Int. Cl.
*E05D 3/06*        (2006.01)
*F16H 21/44*       (2006.01)

(52) U.S. Cl.
CPC ................................. *F16H 21/44* (2013.01)
USPC ............................................ 16/366; 16/342

(58) Field of Classification Search
USPC .......... 16/354, 366, 365, 368, 369, 370, 342;
361/679.08, 679.11, 679.02, 679.15,
361/679.27; 455/90.3, 575.1, 575.3, 575.8;
379/433.12, 433.13; 348/373, 333.01,
348/333.06, 794
See application file for complete search history.

(56) References Cited

U.S. PATENT DOCUMENTS

| | | | | |
|---|---|---|---|---|
| 2,304,223 A * | 12/1942 | Westrope | ......................... | 403/52 |
| 4,617,699 A * | 10/1986 | Nakamura | ...................... | 16/262 |
| 5,325,984 A * | 7/1994 | Ady et al. | ...................... | 220/817 |
| 5,697,125 A * | 12/1997 | Gannon | .......................... | 16/342 |
| 6,253,419 B1 * | 7/2001 | Lu | ..................... | 16/340 |
| 6,301,748 B1 * | 10/2001 | Su-Man | ........................... | 16/342 |
| 6,530,123 B1 * | 3/2003 | Wahlstedt | ........................ | 16/342 |
| 6,928,700 B2 * | 8/2005 | Huong | .............................. | 16/342 |
| 7,607,202 B1 * | 10/2009 | Lee | ................................. | 16/342 |
| 7,958,600 B2 * | 6/2011 | Kuo et al. | ........................ | 16/342 |
| 2002/0038493 A1 * | 4/2002 | Ko et al. | ........................... | 16/303 |
| 2002/0144378 A1 * | 10/2002 | Liao | ................................ | 16/342 |
| 2005/0050686 A1 * | 3/2005 | Kurokawa | ........................ | 16/354 |
| 2006/0236505 A1 * | 10/2006 | Maatta et al. | .................... | 16/366 |
| 2006/0238968 A1 * | 10/2006 | Maatta et al. | .................. | 361/683 |
| 2007/0094845 A1 * | 5/2007 | Chang et al. | ..................... | 16/342 |
| 2008/0151478 A1 * | 6/2008 | Chern | ............................ | 361/681 |
| 2011/0157780 A1 * | 6/2011 | Wang et al. | .............. | 361/679.01 |
| 2011/0232032 A1 * | 9/2011 | Chu et al. | .......................... | 16/221 |
| 2011/0289728 A1 * | 12/2011 | Wang et al. | ..................... | 16/337 |
| 2012/0192381 A1 * | 8/2012 | Zhang et al. | ..................... | 16/366 |
| 2013/0016489 A1 * | 1/2013 | Yeh et al. | ....................... | 361/807 |

* cited by examiner

*Primary Examiner* — Chuck Mah
(74) *Attorney, Agent, or Firm* — Rosenberg, Klein & Lee

(57) ABSTRACT

A dual-shaft pivot device includes a resilient guide assembly composed of a plurality of resilient guide members and first and second pivotal shafts. Each resilient guide member has two accommodation portions at two ends thereof and a connecting groove communicating with the two accommodation portions. One end of the inner wall of each accommodation portion, far away from the connecting groove, has an end protrusion. The first and second pivotal shafts have middle portions which are inserted in the accommodation portions of the resilient guide member. Each middle portion has at least one middle flat surface to get contact with the end protrusion for the middle portion to push the end protrusion during turning to bring resilient deformation of each accommodation portion.

28 Claims, 9 Drawing Sheets

DUAL-SHAFT PIVOT DEVICE

BACKGROUND OF THE INVENTION

1. Field of the Invention

The present invention relates to a dual-shaft pivot device, and more particularly to a dual-shaft pivot device which can generate guide resilience when two pivotal shafts are turned synchronously in opposite directions to a predetermined angle, such that the two pivotal shafts can be synchronously positioned at the predetermined open angle.

2. Description of the Prior Art

As development and change of various electronic products, a conventional pivot structure with two ends of a single pivotal shaft to connect with a pivot member (screen) and a corresponding pivot member (host) cannot meet the demand of different uses. Thus, a dual-shaft pivot device as shown in FIG. 1 and FIG. 2 is widely used. The dual-shaft pivot device comprises first and second pivotal shafts 30, 40, a fastening assembly 6, a pivot positioning assembly 7, and a pivot limit plate 7. The first and second pivotal shafts 30, 40 each have at least one positioning flat surface 301, 401 which extends from a middle section thereof and a fixing portion 303, 403 (which may be outer threads) at the end. The other ends of the first and second pivotal shafts 30, 40 have a connecting portion 302 connected with a pivot member (screen) and a connecting portion 402 connected with a corresponding pivot member (host).

The fastening assembly 6 comprises a seat 65 and a separate positioning plate 64. The seat 65 and the positioning plate 64 respectively have through holes 651, 652 and through holes 641, 642 for insertion of the first and second pivotal shafts 30, 40. The positioning plate 64 has a slot 643 disposed between the two through holes 641, 642. One side of the seat 65, far away from the positioning plate 64, has resilient portions 61, 62 corresponding in position to the through holes 651, 652. The resilient portions 61, 62 are fitted on the ends having the positioning flat surfaces 301, 401 of the first and second pivotal shafts 30, 40. Fixing members 304, 404 which may be nuts are respectively coupled to the fixing portions (outer threads) 303, 403, such that the first and second pivotal shafts 30, 40 and the seat 65 keep fastening resilience. The seat 65 has a positioning portion 63 (which may be a threaded hole) between the resilient portions 61, 62.

The pivot limit plate 8 is disposed at one side of the seat 65, far away from the two resilient portions 61, 62. The pivot limit plate 8 has through holes 81, 82 corresponding to the through holes 651, 652, stop portions 811, 821 which are respectively disposed on the outer edge of one side of the respective through holes 81, 82 in different directions and angles, and a slot 83 between the two through holes 81, 82.

The pivot positioning assembly 7 is disposed between the pivot limit plate 8 and the positioning plate 64. The pivot positioning assembly 7 comprises two link rollers 71, 72 and a movable roller 73. The two link rollers 71, 72 have central coupling holes 711, 721 to fit on the positioning flat surface 301, 401. The outer wall and one side of the two link rollers 71, 72 have positioning recesses 712, 722 and side protrusions 713, 723, respectively. The two side protrusions 713, 723 are subject to the stop portions 811, 821 to form the pivot limit for different directions and angles. The movable roller 73 has a central protruding axle 731. Two ends of the axle 731 are respectively inserted in the slot 643 and the slot 83 so that the movable roller 73 is movable within the limit area. A resilient plate 74 is provided between the movable roller 73 and the pivot limit plate 8. The resilient plate 74 has a central hole 741 for insertion of the axle 731. By the resilient plate 74, the movable roller 73 and the two link rollers 71, 72 are kept in a tightening contact state.

As shown in FIG. 3 to FIG. 7, when the pivot member (screen) and the corresponding pivot member (host) are closed with each other, the first and second pivotal shafts 30, 40 respectively move the two link rollers 71, 72 with the positioning recesses 712, 722 to face the same side (as shown in FIG. 3). As shown in the drawings, one side of the link roller 71, far away from the positioning recess 712, pushes the movable roller 73 to engage with the positioning recess 722 of the link roller 72. At this time, because the relative arc surfaces of the link roller 71 and movable roller 73 are contact with each other, the first pivotal shaft 30 can be pivoted continuously. During pivotal turning, the second pivotal shaft 40 is unable to pivot (as shown in FIG. 4.) until the first pivotal shaft 30 brings the link roller 71 to a predetermined angle (as shown in drawings, the predetermined angle is 180 degrees). The positioning recess 712 of the link roller 71 is turned to face the movable roller 73 (as shown in FIG. 5) to release the contact with the movable roller 73. This moment, the movable roller 73 can slide along the slots 643, 83 and the second pivotal shaft 40 (the link roller 72) is able to pivot.

After that, the second pivotal shaft 40 brings the link roller 72 to pivot reversely toward the first pivotal shaft 30 (the link roller 71), as shown in FIG. 6. During pivotal turning of the second pivotal shaft 40, the circumferential edge of the link roller 72 is contact with the movable roller 73 for the movable roller 73 to engage with the positioning recess 712 of the link roller 71, such that the first pivotal shaft 30 is unable to pivot until the second pivotal shaft 40 brings the link roller 72 to a predetermined angle (as shown in drawings, the predetermined angle is 180 degrees). The positioning recess 722 of the link roller 72 is turned to face the movable roller 73 (as shown in FIG. 7) to release the contact with the movable roller 73. After use, one of the first and second pivotal shafts 30, 40 can be first pivoted reversely to the original closed state.

However, the aforesaid structure has the following shortcomings:

1. During operating, only the first pivotal shaft 30 (the link roller 71) or the second pivotal shaft 40 (the link roller 72) can be pivoted. When the link roller 71 (or the link roller 72) is not turned to the predetermined angle, the other link roller 72 (or the link roller 71) is unable to turn. This is not convenient for use.

2. When in use, the two link rollers 71, 72 don't have a positioning effect except in a closed state or at a specific angle.

3. During movement, the movable roller 73 cannot be kept stably and may deflect easily to result in noises caused by friction of the two link rollers 71, 72 and the movable roller 73, and the turning is not smooth.

Accordingly, the inventor of the present invention has devoted himself based on his many years of practical experiences to solve these problems.

SUMMARY OF THE INVENTION

The primary object of the present invention is to provide a dual-shaft pivot device which can generate guide resilience when two pivotal shafts are turned synchronously in opposite directions to a predetermined angle, such that the two pivotal shafts can be automatically positioned at the predetermined open angle to enhance convenience of use.

In order to achieve the aforesaid object, the dual-shaft pivot device of the present invention comprises a resilient guide assembly and two parallel first and second pivotal shafts. The resilient guide assembly comprises at least one resilient guide member which is a resilient guide plate. At least one end of the resilient guide member has a hollow accommodation portion. The accommodation portion communicates with a connecting grove which extends toward a middle section of the resilient guide member. One end of the inner wall of the accommodation portion, far away from the connecting groove, has an end protrusion. At least one of the first and second pivotal shafts has a middle portion which is inserted in the accommodation portion of the resilient guide member. The middle portion has at least one middle flat surface able to get contact with the end protrusion for the middle portion to push the end protrusion during turning to bring resilient deformation of the accommodation portion so that when the first and second pivotal shafts inserted in the accommodation portion are turned to a predetermined angle, the accommodation portion resiliently presses the middle flat surface for the first and second pivotal shafts to generate a driving force toward the end protrusion.

Preferably, the resilient guide member has two hollow accommodation portions at two ends thereof and a connecting grove between the two accommodation portions to communicate with the two accommodation portions. The inner walls of the two accommodation portions, far away from the connecting groove, have end protrusions, respectively. The first and second pivotal shafts have middle portions which are inserted in the respective accommodation portions of the resilient guide member. The middle portions have middle flat surfaces able to get contact with the end protrusions for the middle portions to push the end protrusions during turning to bring resilient deformation of the accommodation portions so that when the first and second pivotal shafts inserted in the accommodation portions are turned to a predetermined angle, the accommodation portions resiliently press the middle flat surfaces for the first and second pivotal shafts to generate a driving force toward the end protrusions.

Preferably, the end protrusion of the resilient guide member has a guide arc surface at a middle section thereof corresponding in radian to the middle portion of each of the first and second pivotal shafts.

Preferably, the end protrusion of the resilient guide member has flat surfaces at two sides of the guide arc surface.

Preferably, the resilient guide member has side protrusions at two sides of the accommodation portion close to the connecting groove.

Preferably, the resilient guide assembly comprises a plurality of resilient guide members which are arranged side by side.

Preferably, the dual-shaft pivot device further comprises a synchronous linkage assembly. The synchronous linkage assembly comprises first and second coupling seats which are turned synchronously in opposite directions. The first and second coupling seats have first and second coupling holes. The first and second pivotal shafts have end coupling portions which extend from the respective middle portions. The end coupling portions are inserted in the first and second coupling holes of the synchronous linkage assembly to be moved synchronously along with the first and second coupling seats.

Preferably, the end coupling portions of the first and second pivotal shafts each have at least one end flat surface, and the first and second coupling holes correspond in shape and size to the end flat surfaces of the first and second pivotal shafts.

Preferably, the end coupling portions of the first and second pivotal shafts have fixing portions which extend out of the first and second coupling holes, and the fixing portions are adapted for connection of fixing members to prevent disengagement of the first and second pivotal shafts and the first and second coupling seats.

Preferably, one side of the resilient guide assembly, far away from the synchronous linkage assembly, is provided with a spacer, and the spacer has first and second shaft holes corresponding to the first and second coupling holes.

Preferably, one end of each of the first and second pivotal shafts, far away from the end coupling portion, has a connecting portion, and the connecting portions of the first and second pivotal shafts are respectively connected with a pivot member and another corresponding pivot member.

Preferably, the resilient guide assembly and the synchronous linkage assembly are disposed in an accommodation space of a sleeve.

Preferably, the sleeve has a positioned portion at a middle section of the accommodation space, and the synchronous linkage assembly has a positioning portion to mate with the positioned portion.

Preferably, the positioning portion of the synchronous linkage assembly and the positioned portion of the sleeve are connected with a positioning member.

DETAILED DESCRIPTION OF THE PREFERRED EMBODIMENTS

Embodiments of the present invention will now be described, by way of example only, with reference to the accompanying drawings.

Figure 1:
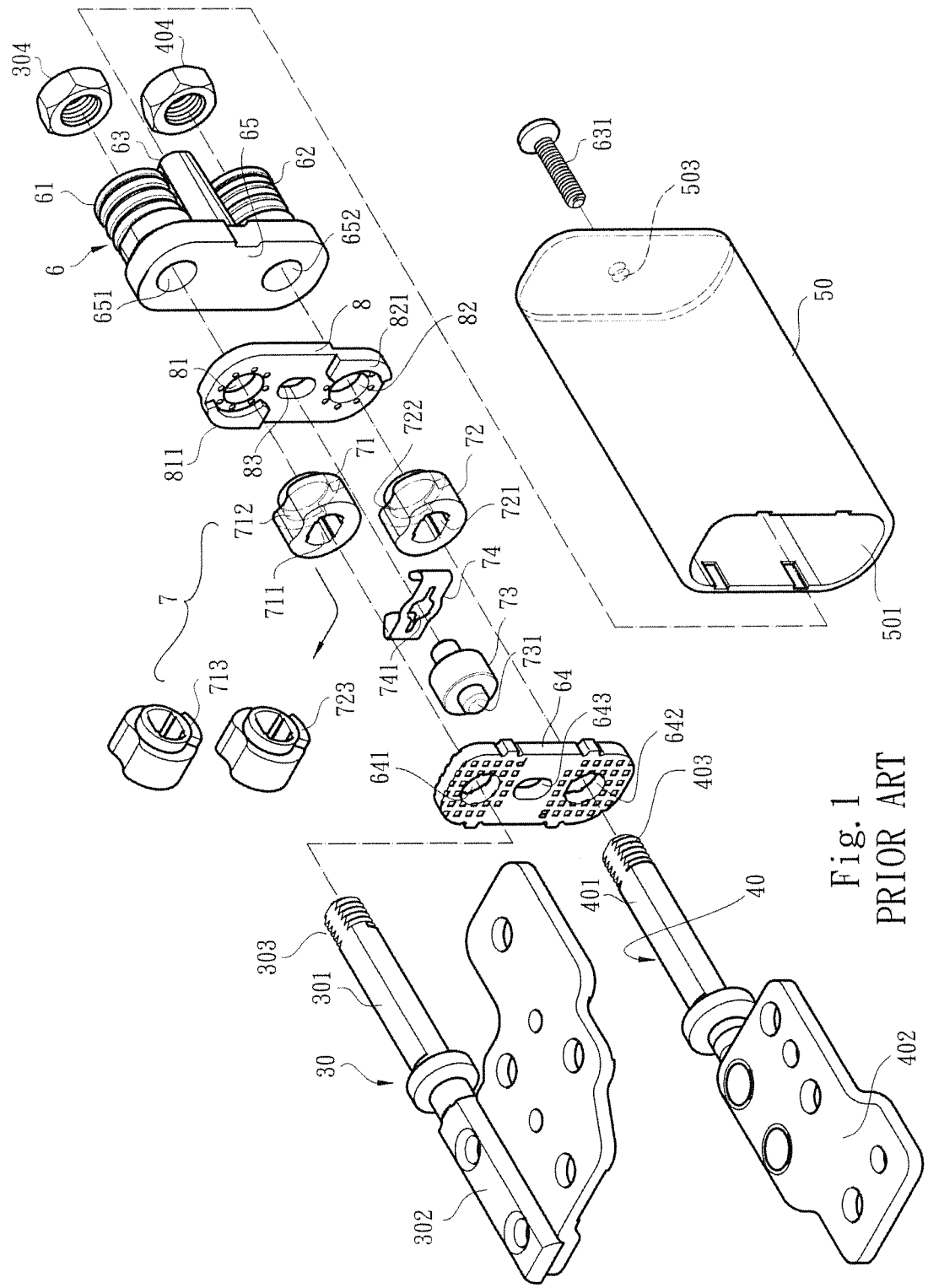
FIG. 1 is an exploded view of a conventional dual-shaft pivot device.
Figure 2:
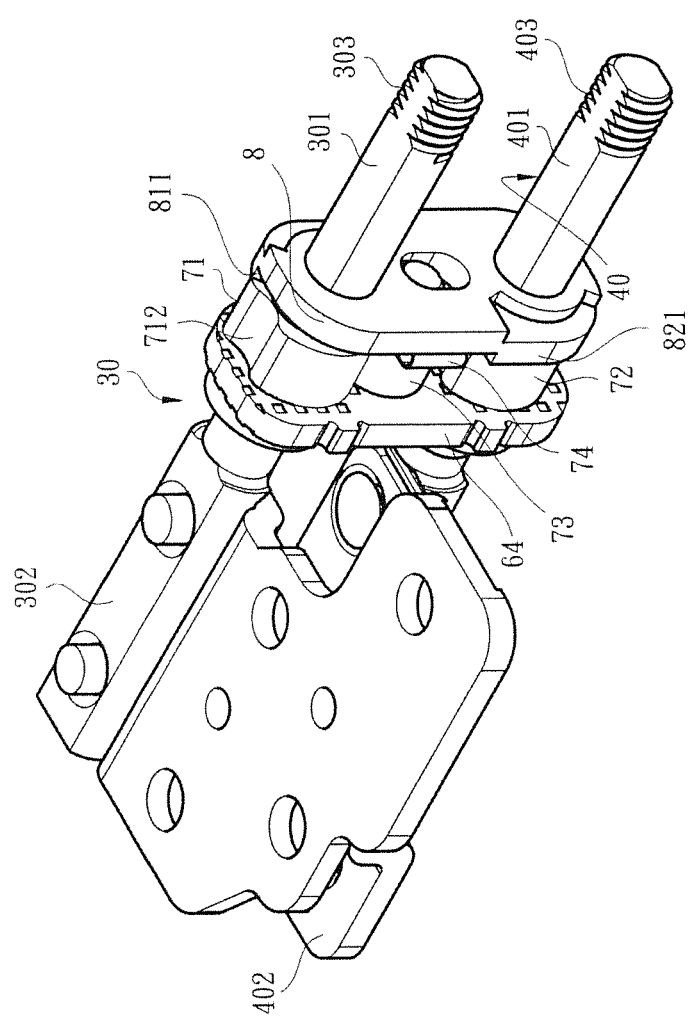
FIG. 2 is a partial perspective view of the conventional dual-shaft pivot device.
Figure 3:
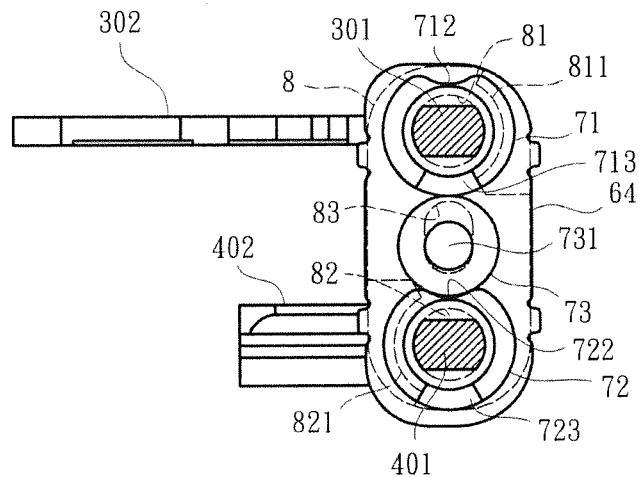
FIG. 3 is a first schematic view showing pivot motion of the conventional dual-shaft pivot device.
Figure 4:
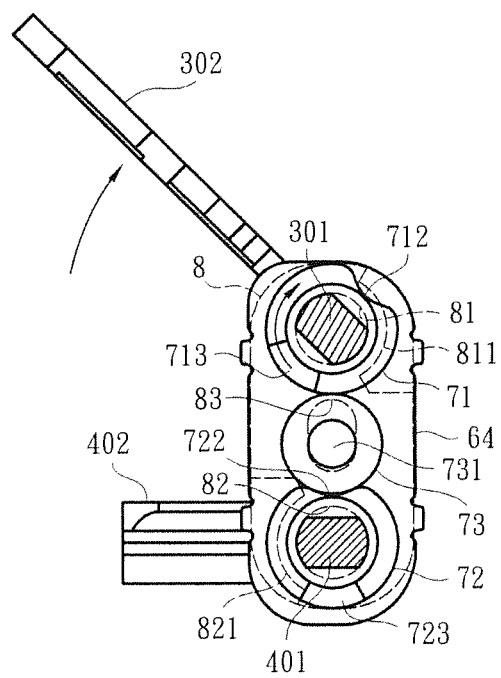
FIG. 4 is a second schematic view showing pivot motion of the conventional dual-shaft pivot device.
Figure 5:
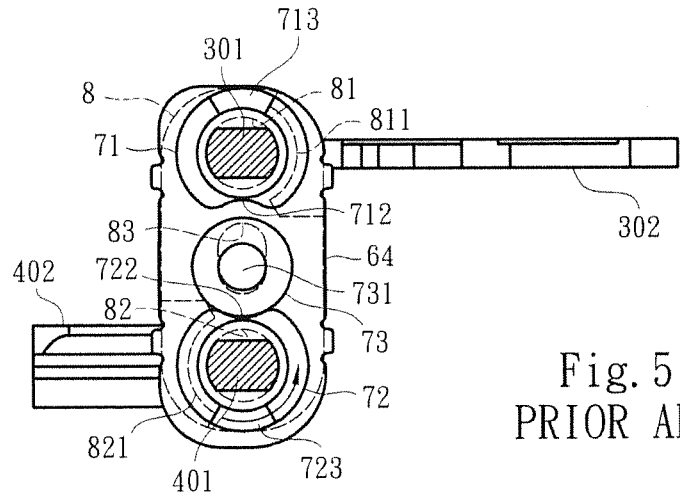
FIG. 5 is a third schematic view showing pivot motion of the conventional dual-shaft pivot device.
Figure 6:
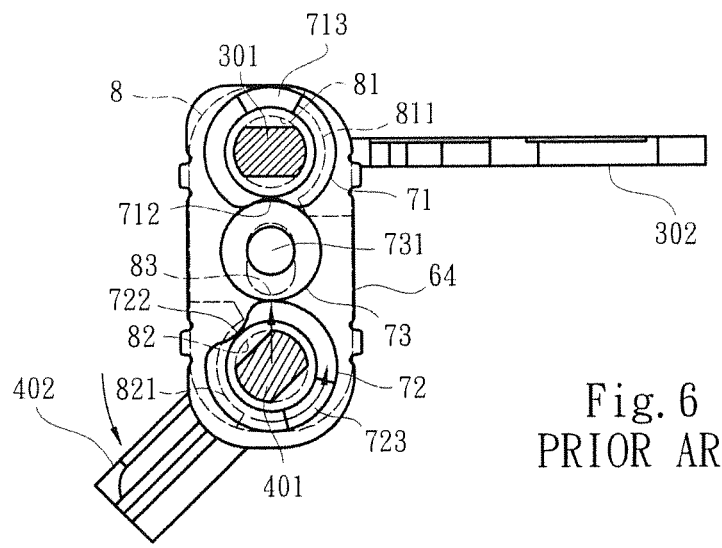
FIG. 6 is a fourth schematic view showing pivot motion of the conventional dual-shaft pivot device.
Figure 7:
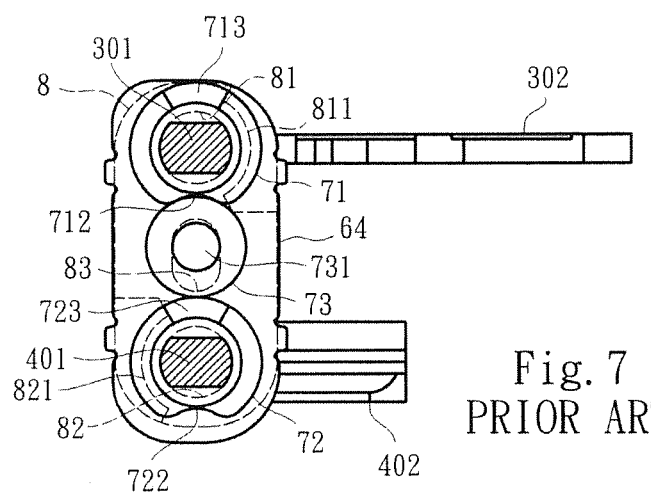
FIG. 7 is a fifth schematic view showing pivot motion of the conventional dual-shaft pivot device.
Figure 8:
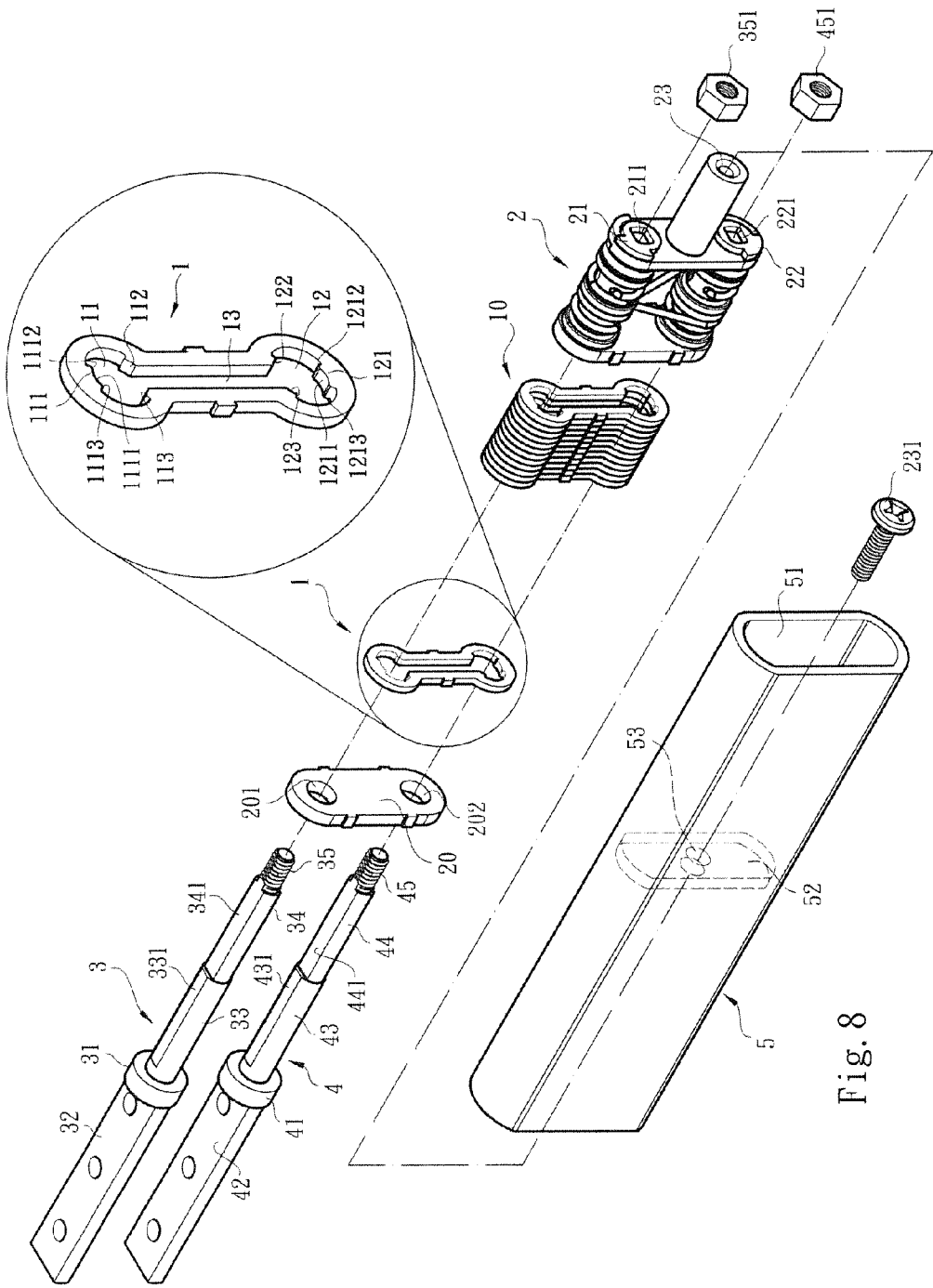
FIG. 8 is an exploded view of the present invention.
Figure 9:
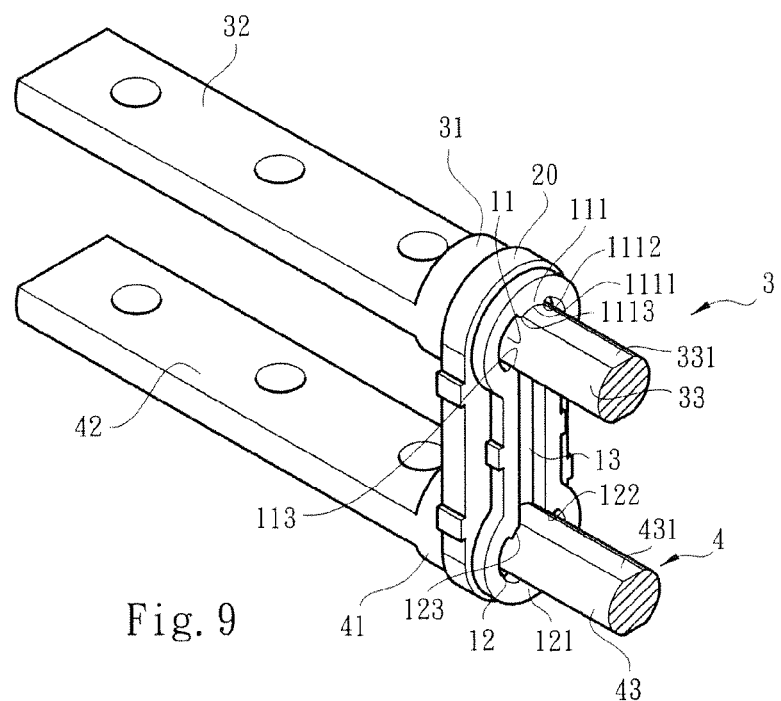
FIG. 9 is a partial perspective view of the present invention.
Figure 10:
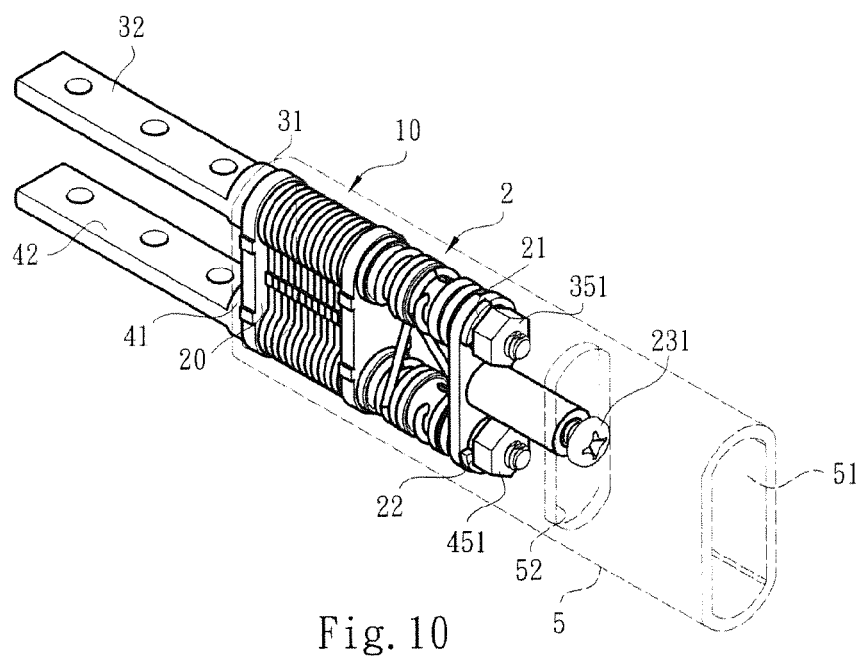
FIG. 10 is a perspective view of the present invention.

As shown in FIG. 8 to FIG. 10, the present invention comprises a resilient guide assembly 10 and two identical first and second pivotal shafts 3, 4. The resilient guide assembly 10 comprises at least one resilient guide member 1 which is a resilient guide plate. The resilient guide member 1 has hollow accommodation portions 11, 12 at two ends thereof and a connecting groove 13 between the two accommodation portions 11, 12 to communicate with the two accommodation portions 11, 12. Through the design of the connecting groove 13, the two accommodation portions 11, 12 have expandable resilience when applied with a force. The inner walls of the two accommodation portions 11, 12, far away from the connecting groove 13, respectively have end protrusions 111, 121. The end protrusions 111, 121 have guide arc surfaces 1111, 1211 at a middle section thereof and flat surfaces 1112, 1113, 1212, 1213 at respective two sides of the guide arc surfaces 1111, 1211. The inner walls of the two accommodation portions 11, 12, close to two sides of the connecting groove 13, further have side protrusions 112 113, 122, 123. When in use, the resilient guide assembly 10 comprises a plurality of resilient guide members 1 which are arranged side by side. The number of the resilient guide members 1 can be adjusted as desired for the two accommodation portions 11, 12 to generate difference resilience.

The first and second pivotal shafts 3, 4 have protruding stop portions 31, 41 at middle sections thereof, connecting portions 32, 42 at one end of the respective stop portions 31, 41 and middle portions 33, 43 at another end of the respective stop portions 31, 41. The middle portions 33, 43 have at least two corresponding middle flat surfaces 331, 431, respectively. The middle portions 33, 43 are inserted in the accommodation portions 11, 12 of the resilient guide member 1.

In the embodiment as shown in the drawings, the first and second pivotal shafts 3, 4 further have end coupling portions 34, 44 and fixing portions 35, 45 which extend from the middle portions 33, 43 in sequence, respectively. The end coupling portions 34, 44 are respectively inserted in first and second coupling holes 211 221 of a synchronous linkage assembly 2. The synchronous linkage assembly 2 comprises first and second coupling seats 21, 22 which are turned synchronously in opposite directions. The first and second coupling holes 211, 221 are defined in the first and second coupling seat 21, 22 to form a synchronous pivot motion. In the embodiment as shown in the drawings, the end coupling portions 34, 44 have at least two corresponding end flat surfaces 341, 441, respectively. The first and second coupling holes 211, 221 correspond in shape and size to the end flat surfaces 341, 441. The fixing portions 35, 45 are adapted for connection of fixing members 351, 451. The fixing portions 35, 45 are outer threads, and the fixing members 351, 451 are bolts to engage with the outer threads. For the first and second pivotal shafts 3, 4 to couple with the synchronous linkage assembly 2, the middle portions 33, 43 of the first and second pivotal shafts 3, 4 are respectively inserted in spaced first and second shaft holes 201, 202 of a spacer 20 so that the first and second pivotal shafts 3, 4 can be kept parallel with each other.

To practice the present invention, the spacer 20, the resilient guide assembly 10 and the synchronous linkage assembly 2 are disposed in an accommodation space 51 of a sleeve 5. The sleeve 5 has a partition portion 52 at a middle section of the accommodation space 51. The partition portion 52 has a positioned portion 53. The synchronous linkage assembly 2 has a positioning portion 23 to mate with the positioned portion 53. In the embodiment of the present invention, the positioned portion 53 is a through hole and the positioning portion 23 is a threaded hole abutting upon the through hole. A positioning member 231 which can be a bolt is inserted through the through hole and screwed to the threaded hole to connect and position the synchronous linkage assembly 2 and the sleeve 5.

Figure 11:
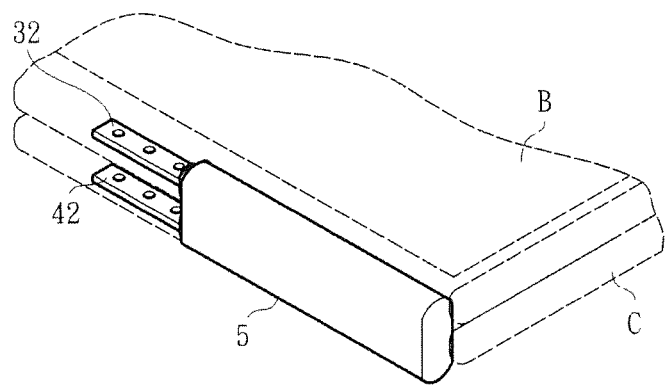
FIG. 11 is a schematic view of the present invention showing that the two corresponding pivot members are closed each other.
Figure 12:
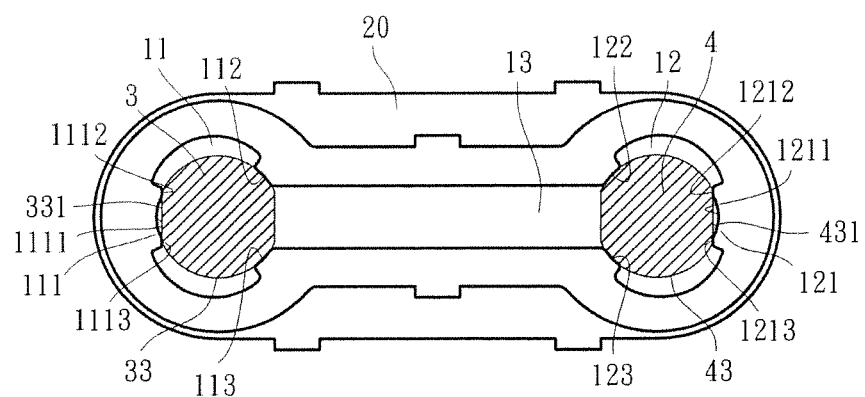
FIG. 12 is a schematic view of FIG. 11 to show the relationship of the two pivotal shafts and the resilient guide assembly.

As shown in FIG. 11 to FIG. 16, when in use, the connecting portions 32, 42 are respectively connected with a pivot member B which can be a liquid crystal screen and a corresponding pivot member C which can be a main host body. When the pivot member B (the liquid crystal screen) and the corresponding pivot member C (the main host body) are closed each other (as shown in FIG. 11), the middle portion 33, 43 of the first and second pivotal shafts 3, 4 are respectively in the accommodation portions 11, 12 of the resilient guide member 1, one of the middle flat surfaces 331, 431 is fully against the flat surfaces 1112, 1113, 1212, 1213, and the side protrusions 112, 113, 122, 123 are respectively in contact with the surfaces of the middle portions 33, 43 at two sides of the other of the middle flat surfaces 331, 431 (as shown in FIG. 12) to form a positioning effect at an appropriate angle.

Figure 13:
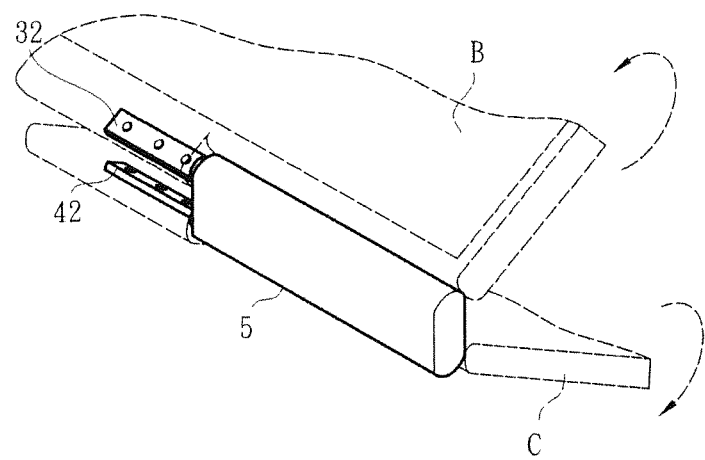
FIG. 13 is a schematic view of the present invention showing that the two corresponding pivot members are opened.
Figure 14:
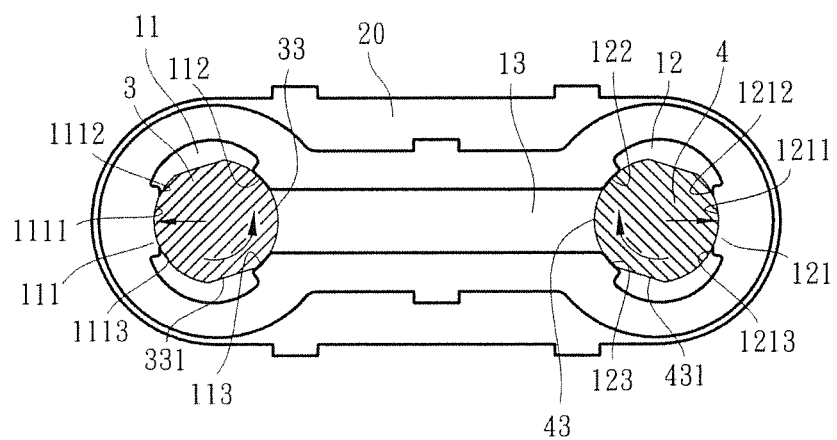
FIG. 14 is a schematic view of FIG. 13 to show the relationship of the two pivotal shafts and the resilient guide assembly.

When the pivot member B and the corresponding pivot member C are opened each other (as shown in FIG. 13), through the motion limit of the synchronous linkage assembly 2, the first and second pivotal shafts 3, 4 are turned synchronously in opposite directions, the middle flat surfaces 331, 431 disengage from the flat surfaces 1112, 1113, 1212, 1213, the middle portion 33, 43 located at one side of the middle flat surfaces 331, 431 are contact with the side protrusions 112, 113, 122, 123 and the middle portion 33, 43 located at another side of the middle flat surfaces 331, 431 are against the guide arc surfaces 1111, 1212 of the end protrusions 111, 121 (as shown in FIG. 14), such that the accommodation portions 11, 12 are deformed and expanded toward the end protrusions 111, 121. The resilient deformation generates a resilient force to act on the two middle flat surfaces 331, 431.

Figure 15:
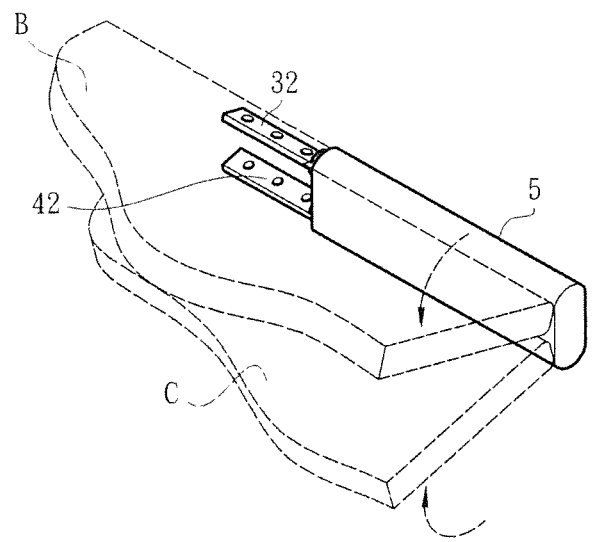
FIG. 15 is a schematic view of the present invention showing that the two corresponding pivot members are opened close to a predetermined angle.
Figure 16:
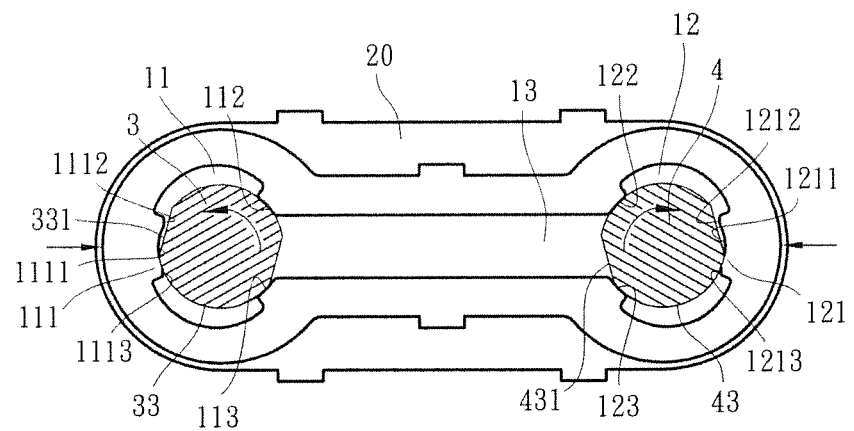
FIG. 16 is a schematic view of FIG. 15 to show the relationship of the two pivotal shafts and the resilient guide assembly.

When the pivot member B and the corresponding pivot member C are turned each other to a predetermined angle (in this embodiment of the present invention, the predetermined angle is 180 degrees, as shown in FIG. 15), one of the middle flat surfaces 331, 431 of the first and second pivotal shafts 3, 4 gradually faces the end protrusions 111, 121. At this time, the resilient force of the end protrusions 111, 121 act on the middle flat surfaces 331, 431 for the first and second pivotal shafts 3, 4 to be turned continuously and synchronously in opposite directions (as shown in FIG. 16) until the positioning angle. After that, the first and second pivotal shafts 3, 4 and the resilient guide member 1 are returned to the position as shown in FIG. 12, the pivot member B and the corresponding pivot member C are kept at the positioning angle stably.

When the aforesaid structure of the present invention is in use, the resilient guide member 1 may have the end protrusion 111 (or the end protrusion 121) and the guide arc surface 1111 (or the guide arc surface 1211) of the accommodation portion 11 (or the accommodation portion 12) at only one end thereof, and the accommodation portion 11 (the accommodation portion 12) communicates with the connecting groove 13 which extends toward the middle section to provide the same pivot guide effect.

To sum up, the dual-shaft pivot device of the present invention can generate guide resilience when the two pivotal shafts are turned synchronously in opposite directions to a predetermined angle so that the two pivotal shafts can turn automatically to be positioned at the predetermined angle.

Although particular embodiments of the present invention have been described in detail for purposes of illustration, various modifications and enhancements may be made without departing from the spirit and scope of the present inven-

What is claimed is:

1. A dual-shaft pivot device, comprising:
a resilient guide assembly, the resilient guide assembly comprising at least one resilient guide member which is a resilient guide plate, each end of the resilient guide member having a hollow accommodation portion, each of the accommodation portions communicating with a connecting groove which extends toward a middle section of the resilient guide member, one end of an inner wall of at least one of the accommodation portions, displaced from the connecting groove, and having an end protrusion; and
two parallel first and second pivotal shafts, at least one of the first and second pivotal shafts having middle portions which are inserted in the respective accommodation portions of the resilient guide member, the middle portions having middle flat surfaces able to get contact with the end portions for the middle portions to push the end protrusions during turning to bring resilient deformation of the accommodation portions so that when the first and second pivotal shafts inserted in the accommodation portions are turned to a predetermined angle, the accommodation portions resiliently press the middle flat surfaces for at least one of the first and second pivotal shafts to generate a driving force toward the end protrusions.

2. The dual-shaft pivot device as claimed in claim 1, wherein the end protrusions of the resilient guide member has guide arc surfaces at a middle section thereof corresponding in radian to the middle portion of each of the first and second pivotal shafts.

3. The dual-shaft pivot device as claimed in claim 2, wherein the end protrusions of the resilient guide member has flat surfaces at two sides of each guide arc surface.

4. The dual-shaft pivot device as claimed in claim 1, wherein the resilient guide member has side protrusions at two sides of each accommodation portion close to the connecting groove.

5. The dual-shaft pivot device as claimed in claim 4, further comprising a synchronous linkage assembly, the synchronous linkage assembly comprising first and second coupling seats which are turned synchronously in opposite directions, the first and second coupling seats having first and second coupling holes respectively, the first and second pivotal shafts having end coupling portions which extend from the respective middle portions, the end coupling portions being inserted in the first and second coupling holes of the synchronous linkage assembly to be moved synchronously along with the first and second coupling seats.

6. The dual-shaft pivot device as claimed in claim 5, wherein the end coupling portions of the first and second pivotal shafts each have at least one end flat surface, and the first and second coupling holes correspond in shape and size to the end flat surfaces of the first and second pivotal shafts.

7. The dual-shaft pivot device as claimed in claim 5, wherein the end coupling portions of the first and second pivotal shafts have fixing portions which extend out of the first and second coupling holes, and the fixing portions are adapted for connection of fixing members to prevent disengagement of the first and second pivotal shafts and the first and second coupling seats.

8. The dual-shaft pivot device as claimed in claim 5, wherein one side of the resilient guide assembly, displaced from the synchronous linkage assembly, is provided with a spacer, and the spacer has first and second shaft holes corresponding to the first and second coupling holes.

9. The dual-shaft pivot device as claimed in claim 5, wherein one end of each of the first and second pivotal shafts, displaced from the end coupling portion, has a connecting portion, and the connecting portions of the first and second pivotal shafts are respectively connected with a pivot member and another corresponding pivot member.

10. The dual-shaft pivot device as claimed in claim 5, wherein the resilient guide assembly and the synchronous linkage assembly are disposed in an accommodation space of a sleeve.

11. The dual-shaft pivot device as claimed in claim 1, wherein the resilient guide assembly comprises a plurality of resilient guide members which are arranged side by side.

12. The dual-shaft pivot device as claimed in claim 11, further comprising a synchronous linkage assembly, the synchronous linkage assembly comprising first and second coupling seats which are turned synchronously in opposite directions, the first and second coupling seats having first and second coupling holes respectively, the first and second pivotal shafts having end coupling portions which extend from the respective middle portions, the end coupling portions being inserted in the first and second coupling holes of the synchronous linkage assembly to be moved synchronously along with the first and second coupling seats.

13. The dual-shaft pivot device as claimed in claim 12, wherein the end coupling portions of the first and second pivotal shafts each have at least one end flat surface, and the first and second coupling holes correspond in shape and size to the end flat surfaces of the first and second pivotal shafts.

14. The dual-shaft pivot device as claimed in claim 12, wherein the end coupling portions of the first and second pivotal shafts have fixing portions which extend out of the first and second coupling holes, and the fixing portions are adapted for connection of fixing members to prevent disengagement of the first and second pivotal shafts and the first and second coupling seats.

15. The dual-shaft pivot device as claimed in claim 12, wherein one side of the resilient guide assembly, displaced from the synchronous linkage assembly, is provided with a spacer, and the spacer has first and second shaft holes corresponding to the first and second coupling holes.

16. The dual-shaft pivot device as claimed in claim 12, wherein one end of each of the first and second pivotal shafts, displaced from the end coupling portion, has a connecting portion, and the connecting portions of the first and second pivotal shafts are respectively connected with a pivot member and another corresponding pivot member.

17. The dual-shaft pivot device as claimed in claim 12, wherein the resilient guide assembly and the synchronous linkage assembly are disposed in an accommodation space of a sleeve.

18. The dual-shaft pivot device as claimed in claim 1, further comprising a synchronous linkage assembly, the synchronous linkage assembly comprising first and second coupling seats which are turned synchronously in opposite directions, the first and second coupling seats having first and second coupling holes respectively, the first and second pivotal shafts having end coupling portions which extend from the respective middle portions, the end coupling portions being inserted in the first and second coupling holes of the synchronous linkage assembly to be moved synchronously along with the first and second coupling seats.

19. The dual-shaft pivot device as claimed in claim 18, wherein the end coupling portions of the first and second pivotal shafts each have at least one end flat surface, and the first and second coupling holes correspond in shape and size to the end flat surfaces of the first and second pivotal shafts.

20. The dual-shaft pivot device as claimed in claim 18, wherein the end coupling portions of the first and second pivotal shafts have fixing portions which extend out of the first and second coupling holes, and the fixing portions are adapted for connection of fixing members to prevent disengagement of the first and second pivotal shafts and the first and second coupling seats.

21. The dual-shaft pivot device as claimed in claim 18, wherein one side of the resilient guide assembly, displaced from the synchronous linkage assembly, is provided with a spacer, and the spacer has first and second shaft holes corresponding to the first and second coupling holes.

22. The dual-shaft pivot device as claimed in claim 21, wherein one end of each of the first and second pivotal shafts, displaced from the end coupling portion, has a connecting portion, and the connecting portions of the first and second pivotal shafts are respectively connected with a pivot member and another corresponding pivot member.

23. The dual-shaft pivot device as claimed in claim 21, wherein the resilient guide assembly and the synchronous linkage assembly are disposed in an accommodation space of a sleeve.

24. The dual-shaft pivot device as claimed in claim 18, wherein one end of each of the first and second pivotal shafts, displaced from the end coupling portion, has a connecting portion, and the connecting portions of the first and second pivotal shafts are respectively connected with a pivot member and another corresponding pivot member.

25. The dual-shaft pivot device as claimed in claim 24, wherein the resilient guide assembly and the synchronous linkage assembly are disposed in an accommodation space of a sleeve.

26. The dual-shaft pivot device as claimed in claim 18, wherein the resilient guide assembly and the synchronous linkage assembly are disposed in an accommodation space of a sleeve.

27. The dual-shaft pivot device as claimed in claim 26, wherein the sleeve has a positioned portion at a middle section of the accommodation space, and the synchronous linkage assembly has a positioning portion to mate with the positioned portion.

28. The dual-shaft pivot device as claimed in claim 27, the positioning portion of the synchronous linkage assembly and the positioned portion of the sleeve are connected with a positioning member.

\* \* \* \* \*